US009631602B2

(12) United States Patent
Lund

(10) Patent No.: US 9,631,602 B2
(45) Date of Patent: Apr. 25, 2017

(54) WIND TURBINE BLADE HAVING A CORROSION PROTECTION STRUCTURE, AND WIND TURBINE HAVING THE SAME

(75) Inventor: Lars Lund, Holstebro (DK)

(73) Assignee: Vestas Wind Systems A/S, Aarhus N. (DK)

(*) Notice: Subject to any disclaimer, the term of this patent is extended or adjusted under 35 U.S.C. 154(b) by 924 days.

(21) Appl. No.: 13/982,193

(22) PCT Filed: Dec. 19, 2011

(86) PCT No.: PCT/DK2011/050494
§ 371 (c)(1),
(2), (4) Date: Oct. 10, 2013

(87) PCT Pub. No.: WO2012/100772
PCT Pub. Date: Aug. 2, 2012

(65) Prior Publication Data
US 2014/0023511 A1 Jan. 23, 2014

Related U.S. Application Data

(60) Provisional application No. 61/437,035, filed on Jan. 28, 2011.

(30) Foreign Application Priority Data

Jan. 28, 2011 (DK) ................. 2011 70053

(51) Int. Cl.
*F03D 1/06* (2006.01)
*B01D 53/00* (2006.01)
*B01D 53/14* (2006.01)
*C23F 13/10* (2006.01)

(52) U.S. Cl.
CPC ......... *F03D 1/0675* (2013.01); *B01D 53/002* (2013.01); *B01D 53/1487* (2013.01);
(Continued)

(58) Field of Classification Search
CPC ... F03D 1/0675; F03D 1/0658; B01D 53/002; B01D 53/1487; B01D 2256/22;
(Continued)

(56) References Cited

U.S. PATENT DOCUMENTS 4,445,989 A   5/1984 Kumar et al.
4,915,590 A * 4/1990 Eckland ............... F03D 1/0658
                                                29/889.21
(Continued)

FOREIGN PATENT DOCUMENTS

DE       10309383 A1    9/2003
DE    102006058668 A1    6/2008
(Continued)

OTHER PUBLICATIONS

International Searching Authority, International Search Report and Written Opinion issued in corresponding International Application No. PCT/DK2011/050494 dated Mar. 28, 2012, 12 pages.
(Continued)

*Primary Examiner* — Gregory Anderson
*Assistant Examiner* — Alexander White
(74) *Attorney, Agent, or Firm* — Wood Herron & Evans LLP

(57) ABSTRACT

The present invention relates to a wind turbine component, having a connecting portion for connecting the wind turbine component to another turbine component and at least part of the connecting portion is formed of a first type of metal, characterized in that: the connecting portion is further provided with an additional part formed of a second type of metal which is connected to the metallic part of the connecting portion; and the second type of metal is more active than the first type of metal, whereby the additional part forms a sacrificial anode. The present invention further relates to a wind turbine having the above component.

7 Claims, 4 Drawing Sheets

(52) U.S. Cl.
CPC ............ *C23F 13/10* (2013.01); *F03D 1/0658* (2013.01); *B01D 2256/22* (2013.01); *B01D 2257/702* (2013.01); *B01D 2259/416* (2013.01); *F05B 2260/95* (2013.01); *Y02E 10/721* (2013.01)

(58) Field of Classification Search
CPC ........ B01D 2257/702; B01D 2259/416; F05B 2260/95; F05B 2240/30; F05B 2230/90; F05B 2280/10; F05B 2280/101; F05B 2280/1021; F05B 2280/1025; F05B 2280/1031; C23F 13/08; C23F 13/10; C23F 13/12; C23F 13/14; C23F 13/16
See application file for complete search history.

(56) References Cited

U.S. PATENT DOCUMENTS 7,230,347 B2 * 6/2007 Brown .................... C23F 13/04
290/40 F
2002/0179429 A1 * 12/2002 Showcatally ........... B63B 59/00
204/196.1
2013/0330197 A1 * 12/2013 Feigl ....................... F01D 5/30
416/219 R

FOREIGN PATENT DOCUMENTS

DE 102007014861 A1 10/2008
EP 2067913 A2 6/2009
GB 2253414 A 9/1992

OTHER PUBLICATIONS

Danish Patent and Trademark Office, Examination Report issued in corresponding DK Application No. PA 201170053 dated Sep. 23, 2011, 4 pages.

International Bureau, International Preliminary Report on Patentability issued in corresponding International Application No. PCT/DK2011/050494 dated Jul. 30, 2013, 8 pages.

* cited by examiner

WIND TURBINE BLADE HAVING A CORROSION PROTECTION STRUCTURE, AND WIND TURBINE HAVING THE SAME

FIELD OF THE INVENTION

The present invention relates to a wind turbine blade having a corrosion protection structure, such as a blade root, and a wind turbine having the same.

BACKGROUND ART

Typically, the major components of a wind turbine, such as blade, nacelle, tower, or hub, are transported to the installation site to be installed there. The connecting portions of these components which allow interconnection are important for a secure connection with other components but usually sensitive to the outside environment, therefore these connecting portions are usually protected by various means in the factory such as oil, cover etc. and then exposed at site for installation.

However, when the components arrive at the site and then the current corrosion prevention structure of the connecting portion is removed, a small amount of corrosion may appear even just during the short time of installation. Given that wind turbines are designed for a 20-year or even longer life time, even a small amount of corrosion occurring during installation is undesirable, in particular for offshore projects where environment is particularly severe, issue of corrosion during installation are problematic.

As an example, blades are usually connected to the hub via inserts secured in the blade root section. Even if a small amount of corrosion exists in the inserts, when the blade is mounted on the bearing there is a risk that corrosion will grow into the endface of the insert and/or the bond line between the insert and the bearing surface. That will reduce the strength of the connection. It is possible to use stainless steel for the insert, but due to the large number of the inserts for large blade, the cost will significantly increase.

SUMMARY OF THE INVENTION

An object of the present invention is, at least partly, to overcome the above disadvantages and drawbacks of the prior art and to provide an improved corrosion protection structure.

The above object, together with numerous other objects, advantages, and features, which will become evident from the below description, is accomplished by a solution in accordance with the present invention by a wind turbine blade, having a connecting portion at a root section for connecting the wind turbine blade to a hub, the root section provided with a plurality of inserts extending into the blade spaced around the root section by which the connection can be made between blade and hub, the inserts having exposed end faces and being formed of a first type of metal, wherein additional parts formed of a second type of metal are connected to the inserts the second type of metal being more electrochemically active than the first type of metal, whereby the additional parts form sacrificial anodes.

The inserts are typically steel or iron inserts secured into the blade root end.

These inserts are fitted into holes in the end of the blade root section and secured therein with adhesive. Preventing the inserts from becoming corroded is important for the strength of blade connection.

In one embodiment, the inserts are of cylindrical form at end region adjacent their exposed face, and the additional parts are in the form of ring secured on the outside of the cylindrical surface In one embodiment, adhesive is provided between the insert and the blade root section to fasten the insert, and the ring is arranged at the boundary, which is facing exterior environment, of the insert and the blade root section; and boundary between the ring and the blade root section is covered with adhesive so as to prevent water/moisture etc. from contacting with the insert through the boundary between the ring and the blade root section.

The first type of metal could be steel or iron, and the second type of metal could be zinc, aluminum or magnesium.

The invention further relates to a wind turbine integrating the above mentioned components.

BRIEF DESCRIPTION OF THE DRAWINGS

The invention and its many advantages will be described in more detail below with reference to the accompanying schematic drawings which, for the purpose of illustration, show some non-limiting embodiments and in which FIG. 1 schematically illustrates a wind turbine.

All the drawings are schematic and not necessarily to scale, and they show only those parts necessary to elucidate the invention, other parts being omitted or merely suggested.

DETAILED DESCRIPTION OF THE PREFERRED EMBODIMENT OF THE INVENTION

Figure 1:
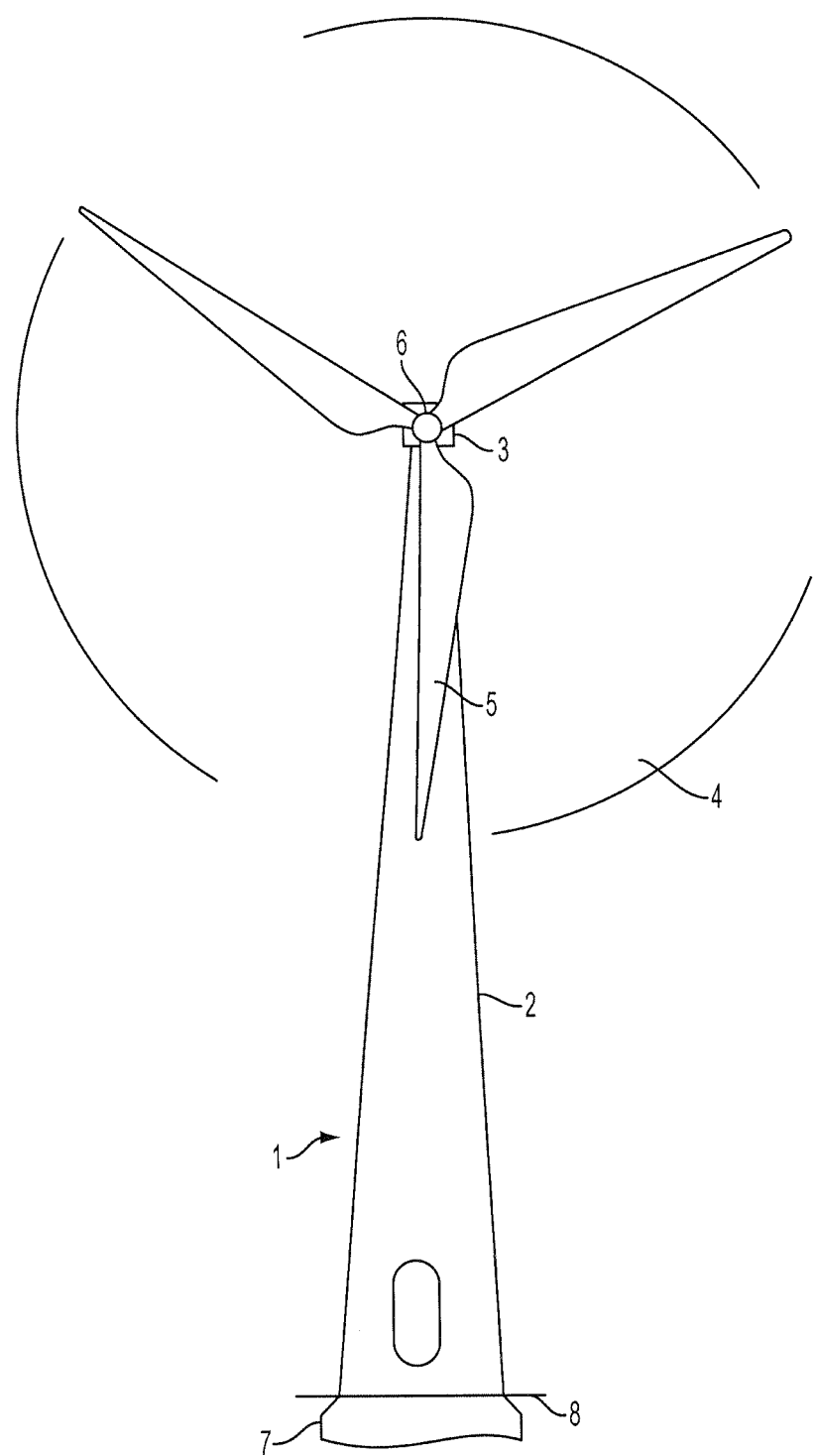

FIG. 1 illustrates a wind turbine 1, comprising a wind turbine tower 2 and a wind turbine nacelle 3 positioned on top of the tower 2. The wind turbine rotor 4 comprises at least one wind turbine blade e.g. three wind turbine blades 5 as illustrated in the figure. The rotor is mounted on a hub 6, which is connected to the nacelle 3 through the low speed shaft extending out of the nacelle front. The wind turbine tower 2 is erected on a foundation 7 either at ground level or at sea level 8 according to whether the wind turbine is of an onshore or an offshore type.

Figure 2:
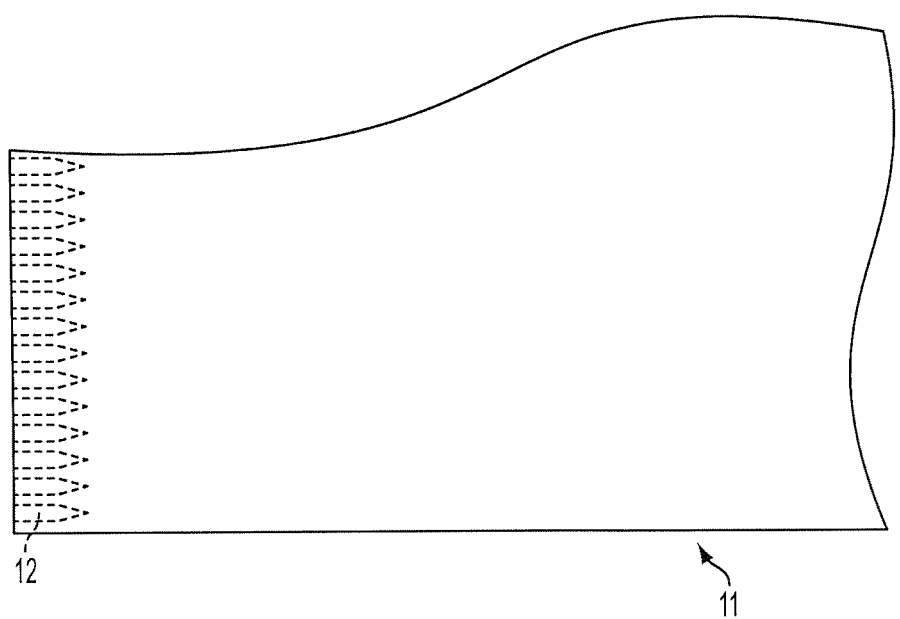
FIG. 2 schematically illustrates a side perspective of a connecting portion of a turbine blade.

FIG. 2 illustrates a blade root section 11, with inserts 12 circumferentially provided in the root section for connecting the blade with hub. In this example, each insert is made from metal such as steel. However, other metallic materials could be used.

Figure 3:
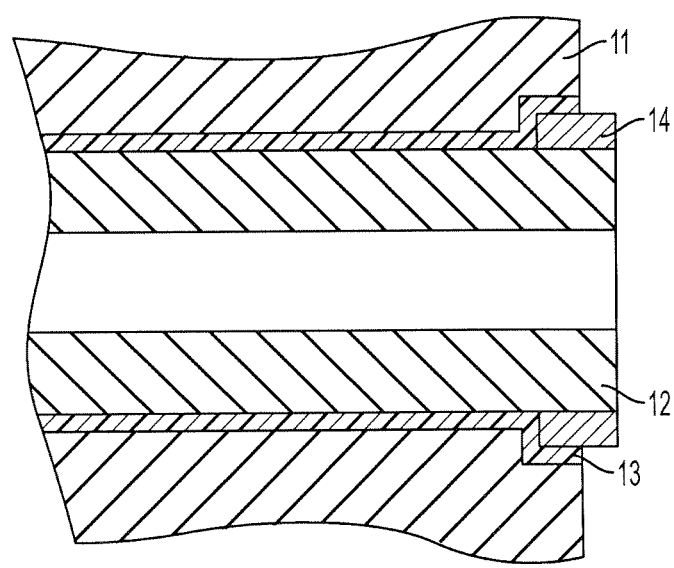
FIG. 3 exemplarily illustrates a cross-section of an insert arrangement according to one embodiment of the present invention.

FIG. 3 shows a cross-section of an insert arrangement, wherein each insert 12 is secured in respective hole in the blade root section 11 and a high-strength adhesive 13 is provided therebetween to secure the insert 12 therein. According to one embodiment of the present invention, the inserts 12 are of cylindrical form at end region adjacent their exposed face, and a corrosion protection structure is provided in the form of a metallic ring 14 fitted on the outside of the end of each insert 12 with the material selected so as to provide a cathodic protection. Thus, material of the ring 14 is more electrochemically active than that of insert 12 in order to create cathodic protection. In a preferred form, ring 14 is made of zinc (Zn), however, it should be understood that all other metallic materials having suitable electrical attribute could be used. The ring 14 will act as a sacrificial anode providing corrosion protection to the exposed end face and in particular at the bond line between the insert 12 and the hole in the blade root section 11.

In order to further enhance corrosion protection effect, the ring 14 may be partially covered with adhesive to prevent water/moisture from entering into the bond line between the insert 12 and the hole in the blade root section 11. As a preferred form, as shown in FIG. 3, adhesive 13 is provided between the insert 12 and the blade root section 11 to fasten the insert 12, and the ring 14 is arranged at the boundary, which is facing exterior environment, of the insert 12 and the blade root section 11. The ring 14 could be at least partially embedded into the boundary between the insert 12 and the blade root section 11, as shown in FIG. 3. Then, boundary between the ring 14 and the blade root section 11 is also covered with adhesive so as to prevent water/moisture etc. from contacting the insert 12 through the boundary between the ring 14 and the blade root section 11.

Figure 4:
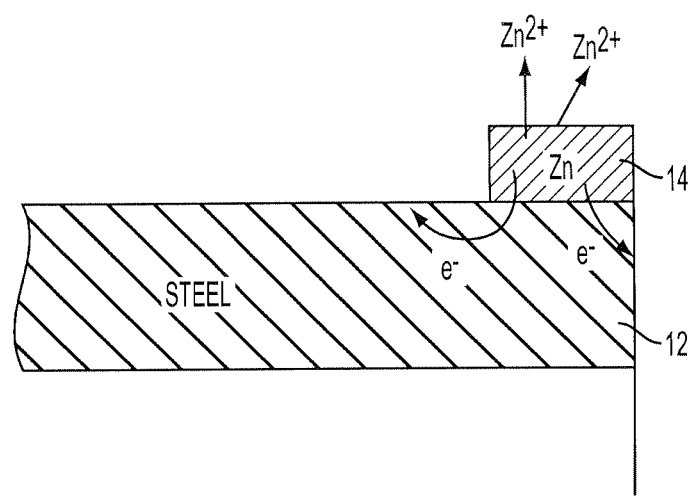
FIG. 4 exemplarily illustrates the interaction principle between a steel insert and a zinc ring when corrosion occurs.

FIG. 4 illustrates the underlying principle of cathodic protection by exemplarily showing the interaction between the steel insert 12 and the sacrificial zinc ring 14. When surface water is present on the exposed end of the insert 12, in the presense of air, the steel insert and the sacrificial anode act as an electrical circuit, the zinc will lose electrons and go into solution as zinc cations. Electrons released from the zinc atoms flow through metallic conduction to the steel where dissolved oxygen is reduced, by gaining the electrons released by the zinc, to hydroxide anions.

Although the use of a zinc anode is preferred, as long as it is more electrically active compared to steel or iron inserts and readily accessible and inexpensive, other metals could be used such as such as aluminum or magnesium.

Also, depending on the specific need of corrosion protection, shape, size, and location etc., of the sacrificial anode can be changed or supplemented with additional parts.

Again, although the above embodiment only describes cathodic protection of connecting portion of a blade root, the present invention is not limited to a blade root connecting portion; rather, it can be applied to other components where same need exists, in particular where a part is exposed to the exterior prior to installation, such as tower connecting portion, the connecting portion between tower and nacelle, and the connecting portion between nacelle and hub etc.

Although the invention has been described above in connection with preferred embodiments of the invention, it will be evident for a person skilled in the art that several modifications are conceivable without departing from the invention as defined by the following claims.

The invention claimed is:

1. A wind turbine blade having a connecting portion at a root section for connecting the wind turbine blade to a hub, the root section provided with a plurality of inserts extending into the wind turbine blade spaced around the root section by which the connection can be made between the wind turbine blade and the hub, the plurality of inserts having exposed end faces and being formed of a first type of metal, wherein additional parts of a second type of metal are connected to the plurality of inserts, the second type of metal being more electrochemically active than the first type of metal, whereby the additional parts form a sacrificial anode.

2. The wind turbine blade according to claim 1, wherein the plurality of inserts are of cylindrical form at an end region adjacent their exposed face, and the additional parts are in the form of a ring secured on an outside of the cylindrical form.

3. The wind turbine blade according to claim 1, wherein adhesive is provided between the plurality of inserts and the blade root section to fasten the plurality of inserts therein, and the additional parts are arranged at a boundary, which is facing an exterior environment, of the plurality of inserts and the blade root section; and the boundary between the additional parts and the blade root section is also covered with adhesive so as to prevent water/moisture etc. from contacting with the plurality of inserts through the boundary between the additional parts and the blade root section.

4. The wind turbine blade according to claim 1, wherein the first type of metal is steel or iron, and the second type of metal is zinc, aluminum or magnesium.

5. A wind turbine, having a wind turbine blade according to claim 1.

6. The wind turbine blade according to claim 1, wherein ring-like additional parts are at least partially embedded in the blade root section.

7. A wind turbine blade having a connecting portion at a root section for connecting the wind turbine blade to a hub, the root section provided with a plurality of elongate inserts extending into the blade spaced around the root section by which the connection can be made between the wind turbine blade and the hub, the inserts having end regions with exposed end faces and being formed of a first type of metal, wherein ring-like additional parts of a second type of metal are connected to the inserts to encircle the end regions thereof, and are at least partly embedded in the blade root section, the second type of metal being more electrochemically active than the first type of metal, whereby the additional parts form a sacrificial anode.

* * * * *